(12) United States Patent
Aschauer et al.

(10) Patent No.: US 10,692,403 B2
(45) Date of Patent: Jun. 23, 2020

(54) MODULAR SECURITY CONTROL DEVICE

(71) Applicant: Siemens Aktiengesellschaft, Munich (DE)

(72) Inventors: Hans Aschauer, Munich (DE); Rainer Falk, Poing (DE); Kai Fischer, Baldham (DE); Steffen Fries, Baldham (DE); Markus Heintel, Munich (DE); Anton Sebastian Huber, Nuremberg (DE); Wolfgang Klasen, Ottobrunn (DE); Joachim Koppers, Forchheim (DE); Axel Pfau, Munich (DE); Georg Trummer, Amberg (DE); Johannes Zwanzger, Neubiberg (DE); Franz Sperl, Oberviechtach (DE); Bernhard Quendt, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 180 days.

(21) Appl. No.: 15/610,035

(22) Filed: May 31, 2017

(65) Prior Publication Data

US 2017/0352297 A1    Dec. 7, 2017

(30) Foreign Application Priority Data

Jun. 1, 2016  (EP) .................................. 16172472

(51) Int. Cl.
*G06F 21/00*  (2013.01)
*G09C 1/00*  (2006.01)
(Continued)

(52) U.S. Cl.
CPC ........... *G09C 1/00* (2013.01); *G05B 19/0425* (2013.01); *G06F 21/44* (2013.01); *G06F 21/602* (2013.01);
(Continued)

(58) Field of Classification Search
CPC ......... G09C 1/00; G06F 21/44; G06F 21/602; G06F 21/85–86; G06F 12/1433;
(Continued)

(56) References Cited

U.S. PATENT DOCUMENTS 10,250,619 B1 *   4/2019   Park .................... H04L 63/1416
2004/1015871      8/2004   Aneweer et al.
(Continued)

FOREIGN PATENT DOCUMENTS

CN          1525271         9/2004
CN        102782695        11/2012
(Continued)

OTHER PUBLICATIONS

Office Action dated May 20, 2019 issued in Chinese Patent Application No. 2017103760429.

*Primary Examiner* — Mahfuzur Rahman
(74) *Attorney, Agent, or Firm* — Cozen O'Connor (57) ABSTRACT

A modular security control device for controlling an apparatus or an installation includes a basic control apparatus which is configured such that an apparatus or an installation which is at least connectable to the basic control apparatus is at least controllable via a sequence of a control program in the basic control apparatus, and includes a security module which is configured to provide or perform a cryptographic functionality for the basic control apparatus, where the security module is connected to the basic control apparatus by a data connection via a data interface, the basic control apparatus is configured to interact with the security module to achieve a security function of the security control device, and where the basic control apparatus is configured to query an identity and/or authenticity of the security module.

27 Claims, 5 Drawing Sheets

(51) Int. Cl.
*G05B 19/042* (2006.01)
*G06F 21/44* (2013.01)
*G06F 21/60* (2013.01)
*G06F 21/85* (2013.01)
*G06F 21/86* (2013.01)

(52) U.S. Cl.
CPC .............. *G06F 21/85* (2013.01); *G06F 21/86* (2013.01); *G05B 2219/24167* (2013.01); *G05B 2219/25205* (2013.01); *G05B 2219/36542* (2013.01); *H04L 2209/12* (2013.01)

(58) Field of Classification Search
CPC ............ G06F 12/1408; H04L 2209/12; H04L 63/0263; H04L 63/0227; G05B 19/0425; G05B 2219/36542; G05B 2219/25205; G05B 2219/24167; G05B 19/058; G05B 2219/21069; H05K 7/1484; H05K 7/1472
See application file for complete search history.

(56) References Cited

U.S. PATENT DOCUMENTS

| | | | | |
|---|---|---|---|---|
| 2005/0015467 | A1* | 1/2005 | Noda | H04L 12/2856 709/220 |
| 2006/0142873 | A1* | 6/2006 | Opem | G05B 9/02 700/1 |
| 2007/0061018 | A1* | 3/2007 | Callaghan | G05B 19/05 700/1 |
| 2008/0016332 | A1* | 1/2008 | Holden | G06F 21/31 713/151 |
| 2008/0313471 | A1* | 12/2008 | Huang | G06F 21/10 713/185 |
| 2009/0086980 | A1* | 4/2009 | Glendinning | H04L 9/0838 380/282 |
| 2010/0099396 | A1* | 4/2010 | Huq | H04L 67/125 455/420 |
| 2011/0022198 | A1* | 1/2011 | Plache | G05B 19/0426 700/86 |
| 2011/0280399 | A1 | 11/2011 | Chieze et al. | |
| 2012/0293970 | A1* | 11/2012 | Joo | G06F 11/3013 361/748 |
| 2013/0010965 | A1 | 1/2013 | Falk | |
| 2014/0297206 | A1* | 10/2014 | Silverman | G01R 22/063 702/58 |
| 2015/0074749 | A1* | 3/2015 | Vasko | G05B 19/4185 726/1 |
| 2015/0278553 | A1* | 10/2015 | Matsuda | G09C 1/00 713/192 |
| 2016/0327923 | A1* | 11/2016 | Papenbreer | G05B 19/048 |
| 2016/0378707 | A1* | 12/2016 | Sikand | B60L 15/20 713/189 |
| 2017/0323113 | A1* | 11/2017 | El-Moussa | G06F 8/61 |

FOREIGN PATENT DOCUMENTS

| | | |
|---|---|---|
| DE | 10 2010 011 657 A1 | 9/2011 |
| DE | 10 2011 081 803 A1 | 2/2013 |
| DE | 10 2013 213 177 A1 | 1/2015 |
| EP | 2 506 100 A2 | 10/2012 |
| RU | 2207617 C1 | 6/2003 |
| RU | 119193 | 8/2012 |
| RU | 2542934 | 2/2015 |

* cited by examiner

MODULAR SECURITY CONTROL DEVICE

BACKGROUND OF THE INVENTION

1. Field of the Invention

The invention relates to a modular security control device for controlling an apparatus or an installation, where the modular security control device includes a basic control apparatus and a security module, and where the security module is connected to the basic control apparatus via a data connection via a data interface.

2. Description of the Related Art

Security control devices are generally known. For example, European patent application EP 2 506 100 A2 discloses an interface module for a modular programmable logic controller, where the interface module includes a "firewall" for monitoring data traffic passing through the interface module.

SUMMARY OF THE INVENTION

It is an object of the present invention is to provide a control device having improved security features.

This and other objects and advantages are achieved in accordance with the invention by a modular security control device configured to control an apparatus or an installation and comprises a basic control apparatus, where the basic control apparatus is configured such that an apparatus or an installation which is connected or can be connected to the basic control apparatus is controlled or can be controlled by means of the sequence of a control program in the basic control apparatus. The modular security control device also comprises a security module that is configured to provide or perform a cryptographic functionality for the basic control apparatus. Here, the security module is connected to the basic control apparatus over a data connection via a data interface. The basic control apparatus is configured to interact with the security module to achieve a security function of the security control device, and to query an identity and/or authenticity of the security module.

Within the scope of the present description, the term "security" relates substantially to the security, confidentiality and/or integrity of data and their transmission and also to security, confidentiality and/or integrity during access to corresponding data. Authentication during data transmissions or during data access also belongs to the term "security" as used within the scope of the present description.

The modular security control device in accordance with the invention provides an improved possibility for data or communication security of such a control device, for example, because the possibility of adding separate or externally developed security crypto modules or similar modules for improving the security features of the control device exists via the additional security module, for example. The security of a control device can therefore be improved in a flexible and possibly user-specific manner and can be specifically and flexibly adapted as a result of the functionality of the security module interacting with the functionality already implemented in the basic apparatus.

Furthermore, a user can increase the trustworthiness of the security functionality in this manner, such as by also independently implementing and/or separately introducing the security functionality within the modular component, because the user can therefore use the high trustworthiness of the separate controllable environment and is less dependent or is not dependent on the trustworthiness of third parties.

The query of identity and/or authenticity information makes it possible to check, for example, whether only components provided for the corresponding use are used or can be used, which improves the security features of the control device even further.

The security control device may be configured, for example, as an automation system, a "controller", a programmable logic controller (a "PLC"), an industrial PC (an "IPC"), a computer, possibly including a real-time system, a modular programmable logic controller or a similar control device.

The installation or apparatus which can be controlled by the security control device may be configured, for example, as a production installation, a machine tool, a robot, an autonomous transport system and/or a similar device, apparatus or installation. For example, the apparatus or the installation may be configured or provided for the manufacturing industry, the process industry, building automation and/or also energy production and distribution, for a traffic safety system and/or traffic control.

The basic control apparatus may correspond, for example, to a control apparatus or a controller without or with a partial security functionality or else a complete security function. Such a control apparatus may be configured, for example, as a central unit of a programmable logic controller, as a programmable logic controller, as an industrial PC, as a PC or as a similar device.

In this case, the basic control apparatus may comprise, for example, a real-time operating system that enables real-time control of an apparatus or an installation that is connected or can be connected to the basic apparatus.

The basic control apparatus and/or the security module may comprise a housing, for example. The housing may be structured such that the basic control apparatus and/or the security module is/are protected from environmental influences. For example, such housings may be configured in accordance with the "International Protection" classification according to DIN 60529, DIN 40050-9 and/or ISO 20653, for example, according to class IP65 or IP67.

A cryptographic functionality is generally understood as meaning, for example, a function for encrypting, for protecting the confidentiality of, for protecting the integrity of and/or for authenticating data (for example user data, control data, configuration data or administrative data). Here, the cryptographic functionality of the security module may comprise, for example, one or more of the functionalities listed below:

key storage,
system and/or user authentication,
attestation,
encryption,
decryption,
calculation of a cryptographic checksum (for example signature),
checking of a cryptographic checksum (for example signature),
key agreement,
key generation,
generation of random numbers (for example seed generation),
licensing,
support for systemic monitoring functions (for example tamper protection, system integrity, SIEM),
monitoring of data, validation of data, and/or filtering of data.

The cryptographic functionalities listed may each again be performed with different methods or combinations of methods, in this case.

The data interface between the security module and the basic control apparatus may be a wired or wireless interface, for example. Here, the data connection via a wired interface can be effected, for example, using a combination of accordingly complementary plug connector components or else via corresponding contact areas or pins. Here, the data interface may be configured as a serial or parallel data interface. Furthermore, the data interface between the security module and the basic control apparatus may also be configured as a wireless interface, such as a WLAN, Bluetooth or Near Field Communication (NFC).

The query of an identity and/or authenticity of the security module may comprise, for example, the query of an item of information relating to a model, a manufacturer, an author, one or more crypto methods and/or functionalities that are implemented or can be implemented, an item of version information, a firmware version or similar information, or the query of the authenticity thereof. Furthermore, the query of an identity and/or authenticity of the security module may comprise, for example, the query of identity information, for example an item of type information, a model identification, an identification number or identifier or the like, and/or the authenticity of such information.

Furthermore, the security module may be additionally also mechanically connected to the basic control apparatus, in particular the security module may be releasably connected to the basic control apparatus. Such connections can be effected, for example, using corresponding latching means, clamping means, screwing means or any desired combinations thereof.

Provision may also be made for the energy to be supplied to the security module via the basic control apparatus, such as via the data interface or via a separate energy supply interface. The energy can also be supplied to the security module via a separate supply. The security module may also comprise a separate energy source, for example a battery, a rechargeable battery, a capacitor and/or a comparable energy source.

The security function of the security control device may consist of, such as any function for encrypting, for protecting the confidentiality of, for protecting the integrity of, for authenticating data and/or the like. In this case, data may be, for example, user data, control data, configuration data and/or administrative data.

In this case, the respective security function of the security control device is achieved by the basic control apparatus and the security module interacting with each other. Such interaction may consist of, for example, the query of security functionalities via the basic control apparatus, such as the reading of a key or the querying of a corresponding checking result. Furthermore, the interaction may also consist of a combination of a security or cryptographic method already provided in the basic control apparatus with the cryptographic functionality of the security module.

Very generally, the interaction of the security module and the basic control apparatus for the purpose of achieving the security function is understood as meaning a procedure in which both of the components mentioned cooperate. Here, cooperation within the scope of the interaction mentioned may also already consist of querying or transmitting an item of information. Alternatively, cooperation within the scope of the interaction mentioned may also be configured such that both the basic control apparatus and the security module make a functional contribution, with respect to the security aspect, to achieving the security function of the security control device.

Furthermore, in order to achieve the security function, provision may be made for further components to interact with the basic control apparatus and/or the security module. Such components may be, for example, one or more further security modules or one or more further applications in the basic control apparatus or an external apparatus for achieving the security function.

In one advantageous embodiment, the security module is releasably connected to the basic control apparatus. This further improves the security features of the security control device because a security module releasably connected to the basic control apparatus makes it possible to exchange such a security module for a further security module. Security features of the security control device, for example, can therefore be flexibly changed and/or adapted in order to adapt the apparatus to changed boundary conditions, for example, or to implement new, under certain circumstances improved, security methods.

In this context, a releasable connection is understood as meaning a connection that remains fixed during normal customary use of the security control device in the art and is released only when special measures are taken to release the connection or in the event of unusual force. Such a releasable connection may be, inter alia, for example, a releasable mechanical connection of the security module to the basic control apparatus which may be in the form of latching, screwing or the like, for example. Furthermore, in the case of a wired data interface between the security module and the basic control apparatus, a releasable connection between these components may comprise a connection via corresponding plug-in elements and/or contact elements for establishing and disconnecting a corresponding data connection. Such a wired data connection may also be additionally protected, for example, using special security measures, such as additional latching or screwing.

The basic control apparatus may be configured in such that the basic control apparatus is operated or can be operated with a basic apparatus functionality when the security module is released. Here, a security module that is released is understood as meaning a security module that at least no longer has a communication connection to the basic control apparatus.

This makes the security functionality of the security control device more flexible by virtue of a basic apparatus functionality being available even without an additional security module in a trusted environment, for example.

In this case, a basic apparatus functionality may comprise, for example, the complete functionality of a controller or of a programmable logic controller, for example, also of a central unit of a programmable logic controller. Furthermore, the basic apparatus functionality may also comprise already restricted security functions or complete security functions. The basic apparatus functionality may be provided, for example, such that at least control of the installation or the apparatus to be controlled to a conventional extent is thereby ensured.

Furthermore, the basic control apparatus can be configured to interact with a second security module that can be exchanged for the security module and has a second cryptographic functionality to achieve the security function and/or a further security function of the security control device. This further improves the security features of the security control devices by virtue of the use of various security technologies being flexibly enabled, for example, or else a security module being able to be easily exchanged or else replaced with an improved security module.

In this case, the second security module may be configured in a manner corresponding to a security module in accordance with the presently disclosed embodiments of the invention. In particular, it may be configured with respect to shape and interface geometry, such that it can be connected to the basic control apparatus and/or can be fitted to the latter or introduced into the latter instead of the security module.

The second security module can again be connected to the basic control apparatus via the data interface or a further data interface. Here, the cryptographic functionality of the second security module may be comparable to that of the security module and may again result in the security function of the security control device being achieved, for example. Furthermore, the second cryptographic functionality may also differ from the cryptographic functionality of the security module such that a further security function of the security control device, which differs from the security function, emerges or such a further security function becomes possible.

The basic control apparatus may comprise, for example, a housing, where a recess in the housing is configured to at least partially accommodate the security module. Furthermore, an interface connection element for the data interface is provided in the basic control apparatus such that, when the security module is accommodated in the recess, data are interchanged or can be interchanged between the basic control apparatus and the security module. This facilitates the handling, and in particular secure handling, of the security control device because inadvertent incorrect operation of the security module or of the entire control device is made more difficult. Here, the housing may already be configured in the above-described manner, such as in accordance with an "International Protection" classification.

The recess may be configured, for example, as an opening in the housing or a corresponding shaft for partially accommodating or fully accommodating the security module. In particular, a cover may also be provided, in particular, which cover protects the security module and/or the corresponding interface elements from environmental influences and/or also incorrect operation and inadvertent removal or damage. Furthermore, the recess may also be configured to accommodate a plurality of corresponding security modules. Interface connection elements may be, for example, in the form of corresponding plug connector elements, contact elements or antennas for a wireless interface.

In the case of the security control device, a protector may be provided and configured such that, in a protected state of the security control device, separation and/or wiretapping of the data connection between the basic control apparatus and the security module is/are prevented or impeded, in particular such that the security module is still fixed relative to the basic control apparatus in the protected state.

Such a protector further improves the security features of the security control device because this prevents or impedes disruption of the security functionality, such as by disconnecting the data connection between the basic control apparatus and the security module. Such a protector may comprise, for example, a mechanical protector, such as a lock, a latch, a screw, a screw protector, a mechanical lock, a seal, or a lead seal. Here, the entire security module can be accordingly protected using the basic control apparatus, for example. Furthermore, separation of the data connection between the security module and the basic control apparatus can also be accordingly protected.

A protector may furthermore also be configured such that wiretapping or tapping of information from the security module, from the basic control apparatus or from the region of the data connection between the security module and the basic control apparatus is prevented or impeded, such as by corresponding measures, for example, mechanical, electrical and/or data technology measures. Such a mechanical protector may be, for example, corresponding shields, sheaths or other mechanical protective measures. Corresponding electrical protectors may comprise, for example, sensors or corresponding circuit breakers that can detect and/or report electrical contact-making of the elements or connections mentioned.

This also enhances the security features of the security control device because, in particular, illegal and/or unauthorized access to the security control device and, in particular, also to the security measures provided there can be prevented or at least impeded in this manner.

Provision may also be made for identification information relating to the security module to be transmitted to the basic control apparatus via the data interface and to be stored in the basic control apparatus. Provision may also be made for identification information relating to the basic control apparatus to be transmitted to the security module via the data interface and to be stored in the security module.

Transmitting corresponding identification information makes it possible, for example, to identify the respective other partner and therefore to check an identity and/or authenticity of a respectively connected partner, for example. This makes it possible to ensure, for example, that only approved, permitted, suitable or accordingly authorized security modules or basic control apparatuses are combined or can be combined with the respective other component. This also makes it possible to further improve the security features of a corresponding device.

In this case, identification information may comprise information relating to a model, a manufacturer, one or more crypto methods and/or functionalities that are implemented or can be implemented, an item of version information, a firmware version or similar information. Corresponding identification information can be transmitted from the security module to the basic control apparatus on the request of the basic apparatus, for example. Accordingly, corresponding identification information can be transmitted from the basic control apparatus to the security module at the request of the security module, for example. This can occur, for example, as part of an authentication operation in the case of a newly connected security module or as a regular status check authentication operation.

The corresponding identification information may be stored temporarily or permanently, for example. The storage can also be performed permanently, for example, as part of a corresponding list or database or a corresponding audit trail. This makes it possible to understand, for example, when which security modules were connected to a corresponding basic control apparatus, for example. This also makes it possible to further improve the security features of a corresponding control device.

The basic control apparatus and/or the security module may also be configured such that separation and/or wiretapping of the data connection between the basic control apparatus and the security module is/are or can be detected, recorded and/or logged.

Corresponding sensors or checking devices, for example, may be provided for this purpose. If such a checking device detects, for example, that a communication connection between the basic control apparatus and the security module has been interrupted or disconnected, this can be recorded and logged, for example, in a corresponding database, for example, including a recording time and further information. Such further information may be, for example, information relating to the control of the connected installation or the connected apparatus and a corresponding apparatus and machine state. If a corresponding wiretapping protection device detects the wiretapping of a data connection inside the security module, inside the basic control apparatus or between these two, this may likewise be accordingly recorded and logged, such as together with a recording time and further information, in a corresponding list or database.

Provision may also be made for a security-relevant action to be initiated after separation and/or wiretapping of the data connection between the basic control apparatus and the security module has/have been detected, recorded and/or logged in this manner.

In this case, such a security-relevant action may be, for example, any action that relates to a security function of the modular security control device, such as a corresponding alarm signal, a corresponding alarm message, deletion of keys, blocking of functionalities or further comparable and/or additional actions.

The basic control apparatus may also be configured to check an identity and/or authenticity of a security module which is connected via the data interface, where the basic control apparatus, the security module and the data interface is able to be configured in accordance with the present disclosed embodiments of the invention.

In this case, identity information, such as an item of type information, a model identification, an identification number or identifier or the like, and/or the authenticity of such information can be checked, for example. Furthermore, a security-relevant action in accordance with the present disclosed embodiment can be initiated, for example, after an unsuccessful check of an identity or authenticity.

The security module may also be configured to check an identity and/or authenticity of a basic control apparatus in accordance with disclosed embodiments of the present invention that is connected via the data interface. In this case, a corresponding security-relevant action can also be caused or initiated in the event of an unsuccessful check of the identity and/or authenticity.

This achieves improved security of the system by virtue of only components provided for the corresponding use being used or being able to be used with increased security as a result of checking the identity and/or authenticity information and by virtue of accordingly provided security standards thus being able to be complied with, for example.

The basic control apparatus may also comprise, for example, a data bus for interchanging data with an external device, the data interface to the security module inside the basic control apparatus being configured and arranged in such a manner that data interchanged between the basic control apparatus and the external device via the data bus are passed or can be passed through the security module.

This makes it possible to advantageously use, for example, security modules that are configured, for example, for user-specific or interchangeable data recognition or modification, such as encryption or another cryptographic action, these being able to be directly applied to data transmitted to the external device or coming from the latter. This makes it possible to implement, for example, flexibly corresponding encryption modules in a corresponding security control device.

External devices may be, for example, input and/or output modules of a programmable logic controller, a controlled apparatus or a controlled installation, a further control system, an operating device (for example, a Human Machine Interface (HMI)), an operating and observation system (for example a "SCADA" system), a programming apparatus, an engineering system or similar systems. This makes it possible to make communication with such systems more secure, for example, and furthermore also makes it possible to flexibly adapt the degree and method of the security methods used to the systems and a particular environment or environmental conditions.

In this case, the basic control apparatus may comprise a data bus or a plurality of data buses. Provision may also be made for the communication of only one data bus, of a plurality of the data buses or all data buses of a corresponding basic control apparatus to be passed via the corresponding security module.

Provision may also be made for the basic control apparatus to comprise a data bus for interchanging data with an external device, and for the data interface to the security module inside the basic control apparatus to be configured and arranged such that data interchanged between the basic control apparatus and the external device via the data bus are not passed through the security module.

Such a configuration is suitable, for example, for security modules that do not have an implementation of the security mechanism that acts directly on data to be transmitted, but rather provide corresponding further security mechanisms. This may comprise, for example, a functionality of key management, the authentication of a user or specific data, the generation of random numbers or the like. Furthermore, such a configuration is also suitable, for example, for security modules that have a separate interface for communicating with one or more external devices.

In this case, provision may also be made for the basic control apparatus to comprise a plurality of data buses, in which case only one data bus is not passed through the security module, a plurality of the data buses are not passed through the security module or none of the data buses is passed through the security module.

In the case of two data buses provided in the basic control apparatus, it is therefore possible, for example, for one of the data buses to be passed through the security module, while another data bus is not passed through the security module. This makes it possible to protect, for example, encrypt or monitor, communication from a secure environment via security technology, for example, while communication inside a protected zone can be performed in an unprotected manner, such as via a field bus in an automation system.

In another advantageous embodiment, the security module may comprise a separate external module interface for communicating with one or more external devices. The security module may be or may have been directly connected to one or more other control devices, one or more computers (for example, having an engineering system or a SCADA system), one or more field devices, one or more other security modules (for example in accordance with the present embodiment) via this interface, for example.

In this case, the interface may be configured, for example, as a field bus interface, an Ethernet interface, an Internet interface or a comparable communication interface. It would therefore be possible, for example, to adapt a security control device in accordance with the present embodiment to existing different and/or customer-specific security protocols on a field bus interface of an automation system, for example.

The basic control apparatus may also comprise a detection device which can be configured in such that the detection device can be used to determine whether a security module is connected to the basic control apparatus via the data interface.

Such a detection device may be configured, for example, as a separate software application or a hardware assembly or as part of the operating system or "firmware" of the basic control apparatus, for example. The detection device may also furthermore be configured such that it queries identification information relating to the security module and stores and possibly also checks the information. Furthermore, the detection device may also be configured to authenticate or check the authenticity of a connected security module.

In this regard, provision may also be made for the basic control apparatus to be configured such that at least one functionality of the basic control apparatus is prevented if the detection device does not detect a security module connected via the data interface. This makes it possible, for example, to achieve the situation in which particular functionalities of the basic control apparatus are available only when a corresponding security module is connected to the basic apparatus.

Furthermore, provision may also be made for essential parts or the entire control functionality of the basic control apparatus to be prevented or stopped if the detection device does not detect a security module connected via the data interface.

The basic control apparatus may also be configured such that a separate basic apparatus crypto functionality provided in the basic control apparatus is used instead of a cryptographic functionality of a security module if the detection device does not detect a security module connected via the data interface.

This makes it possible, for example, to achieve a secure basic functionality of the basic control apparatus or a minimum security of this apparatus by using a separate crypto functionality implemented in the basic control apparatus if a security module is not connected to the basic control apparatus. Here, the separate basic apparatus crypto functionality can be configured a manner corresponding to a cryptographic functionality of a security module in accordance with the present embodiment.

In this case, a basic control apparatus configured as explained above may also be configured such that a cryptographic functionality of a connected security module is used instead of the separate basic apparatus crypto functionality or in combination with the separate basic apparatus crypto functionality if the detection device detects a security module connected via the data interface.

This makes it possible to achieve a situation in which the functionality of the security module is then also actually used if a security module is used with the basic control apparatus, for example. A corresponding security control device can therefore be flexibly set up by virtue of a separate basic apparatus crypto functionality provided in the basic apparatus being provided as a basic functionality, for example, and by virtue of extended, improved or additional security functionalities being able to be added, for example, via corresponding security modules.

Another advantageous configuration may provide for the modular security control device to comprise a further security module which is configured to provide or perform a further cryptographic functionality for the basic control apparatus, where the further security module is connected to the basic control apparatus via a further data connection over a further data interface.

Furthermore, additional security modules corresponding to the further security module may also be provided.

The further security module comprises, for example, a further cryptographic functionality which may be configured in a manner corresponding to the cryptographic functionality of the security module in accordance with the present embodiments. The further cryptographic functionality may supplement the cryptographic functionality of the security module, for example, or may provide the basic control apparatus with an additional functionality. Furthermore, the further cryptographic functionality may also correspond to the cryptographic functionality of the security module.

As complementary cryptographic functionalities of the security module and of the further security module, provision may be made, for example, for the cryptographic functionality of the security module to comprise key management, while the further cryptographic functionality of the further security module comprises encryption of data. This makes it possible to implement the mechanisms of key management and the actual encryption, which should be handled in a thoroughly different manner, in two different, complementary security modules.

Here, the further security module may in turn be configured in a manner corresponding to a security module in accordance with the present embodiments. In particular, the further security module may be releasably connected to the basic control apparatus, for example, this releasable connection likewise again being able to be configured in accordance with the present embodiments. Furthermore, the further security module may also be permanently connected to the basic control apparatus, for example, or may be permanently integrated in the latter. The further security module may also be provided, for example, as electronics or "hardware" which can be programmed or configured by a user or customer, for example designed and set up as a "Field Programmable Gate Array" (FPGA).

A user, for example, can use such an FPGA to permanently implement his own security mechanisms in a corresponding security control device. This makes it possible to further improve the security features of such a system because a user can use his own security mechanisms that are known only to him, and increased security of such a system can therefore be achieved.

The further data interface may also be configured in a manner corresponding to a data interface in accordance with the presently disclosed embodiments. In particular, this data interface may again be provided as a wired and/or wireless interface. In this case, the further data interface may correspond to the data interface to the security module or else may be in the form of another interface type or another interface modification.

A security control device having a security module and a further security module may also be configured such that the basic control apparatus is configured to interact with the further security module in order to achieve a further security function of the security control device. In this case, the further security function may be configured in a manner corresponding to a security function in accordance with the present embodiments. In particular, the interaction of the basic control apparatus with the further security module may also be configured in a manner corresponding to the interaction of the basic control apparatus with the security module in accordance with the present embodiments.

In addition, a security control device having a security module and a further security module may also be configured such that the further security module is configured to directly interact with the security module.

Such interaction of both security modules may occur, for example, via the respective data interfaces to the basic control apparatus and/or else via a further data interface for direct communication of both security modules.

In this manner, the modules can directly interact and may together implement complementary or additive security functions for example. For example, such interaction of two modules may protect the interchange of data during the interaction, for example of authentication, integrity and/or encryption functionalities.

A modular security control device in accordance with the present embodiments may also be configured in such that the security module is configured as an electronic module which can be programmed or configured by a user, in particular an electronic module which can be permanently programmed or configured by a user.

In this case, such an electronic module may be configured, for example, as a "hardware" element, such as an integrated circuit, or an electronic assembly. For example, the electronic module may be configured as a "Field Programmable Gate Array" (FPGA). This electronic module may be permanently connected to the basic control module, for example. Furthermore, the electronic module may also be releasably connected to the basic control module.

This makes it possible to further improve the security of the security control device by virtue of a user being able to implement their own proprietary security mechanisms in the control device and special privacy protection of the security measures used therefore becoming possible.

It is also an object of the invention to provide a method for operating a modular security control device in accordance with the present invention, where the basic control apparatus and the security module each have an interface connection element that is used to establish the data connection between the basic control apparatus and the security module. In this case, the method comprises disconnecting the data connection between the basic control apparatus and the security module, and establishing a data connection via the data interface between the basic control apparatus and a second security module having a second cryptographic functionality.

Here, the data connection between the basic control apparatus and the security module can be disconnected, for example, by spatially separating the interface connection elements of the basic control apparatus and the security module. The data connection between the basic control apparatus and the second security module can be established, for example, by bringing together, and/or making contact between, an interface connection element of the second security module and the interface connection element of the basic control apparatus. In this case, the establishment of the data connection may furthermore also comprise subsequent communication for establishing a functioning data connection.

Interface connection elements of the basic control apparatus and the respective security module may comprise or consist of, for example, accordingly interacting plug elements, contact elements or else antennas. Furthermore, the second security module may be configured in a manner corresponding to a security module in accordance the present embodiments.

The basic control apparatus and the second security module may also be configured such that the second security module can be placed on or in the basic control apparatus and can be connected to the latter instead of the security module.

Provision may also be made for identification information relating to the second security module to be transmitted to the basic control apparatus via the data interface, after establishing the data connection between the basic control apparatus and the second security module, and to be stored in the basic control apparatus. Furthermore, provision may also be made for identification information relating to the basic control apparatus to be transmitted to the second security module via the data interface, after establishing the data connection between the basic control apparatus and the second security module, and to be stored in the second security module. Here, the respective transmission can be implemented at the request of the respective receiving apparatus, for example. Accordingly, the transmission can also be performed at the instigation of the transmitting apparatus. The identification information relating to the second security module can be configured in a manner corresponding to identification information in accordance with the present embodiments.

Provision may also be made for the basic control apparatus to check an identity and/or authenticity of the second security module after establishing the data connection between the basic control apparatus and the second security module. Furthermore, the second security module can also check an identity and/or authenticity of the basic control apparatus after establishing the data connection between the basic control apparatus and the second security module.

In a further embodiment, a security error measure can be initiated after an unsuccessful or erroneous check of the identity and/or authenticity of the second security module and/or of the basic control apparatus. Here, the identity and/or authenticity of the respective apparatuses or modules can be effected, for example, by checking identification data relating to these modules according to the present description and/or also the authenticity of the data. If such an identity and/or authenticity cannot be identified or verified, there may be an unsuccessful or incorrect check and a corresponding security error measure may be initiated. Such a measure may comprise, for example, an alarm, a corresponding error message and/or the stopping or preventing of one, a plurality of or all functionalities of the basic control apparatus. The security error measure may be established, for example, according to a security-relevant activity corresponding to the present embodiment.

Crypto functions for a modular security control device in accordance with the present embodiment can be provided for the first time, for example, using one or more security modules according to the present description. Furthermore, crypto functions present in the security control device can also be replaced in this manner, for example, or the crypto functions available there can be supplemented, such a supplementation preferably being able to be effected such that a security level of the combined crypto functions corresponds to at least one security level of each individual function.

It is also an object of the invention to provide a modular security control device for controlling an apparatus or an installation, comprising a basic control apparatus, where the basic control apparatus is configured such that an apparatus or an installation which is connected or can be connected to the basic control apparatus is controlled or can be controlled via the sequence of a control program in the basic control apparatus, and a security module that is configured to provide or perform a cryptographic functionality for the basic control apparatus, where the security module is connected to the basic control apparatus over a data connection via a data interface, and where the basic control apparatus is configured to interact with the security module to achieve a security function of the security control device.

In this case, the security control device, the basic control apparatus, the security module, the data interface, the data connection, the cryptographic functionality and/or the security function may also be advantageously configured in accordance with the disclosed embodiments.

Such a modular security control device provides an improved possibility for data or communication security of such a control device, for example, because the possibility of adding separate or externally developed security crypto modules or similar modules for improving the security features of the control device exists via the additional security module, for example. The security of a control device can therefore be improved in a flexible and possibly user-specific manner and can be specifically and flexibly adapted as a result of the functionality of the security module interacting with the functionality already implemented in the basic apparatus.

Furthermore, a user can increase the trustworthiness of the security functionality in this manner, for example, by also independently implementing and/or separately introducing the security functionality within the modular component, because the user can use the high trustworthiness of the separate controllable environment and is less dependent or is not dependent on the trustworthiness of third parties.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below by way of example with reference to the accompanying figures, in which.

DETAILED DESCRIPTION OF THE EXEMPLARY EMBODIMENTS

Figure 1:
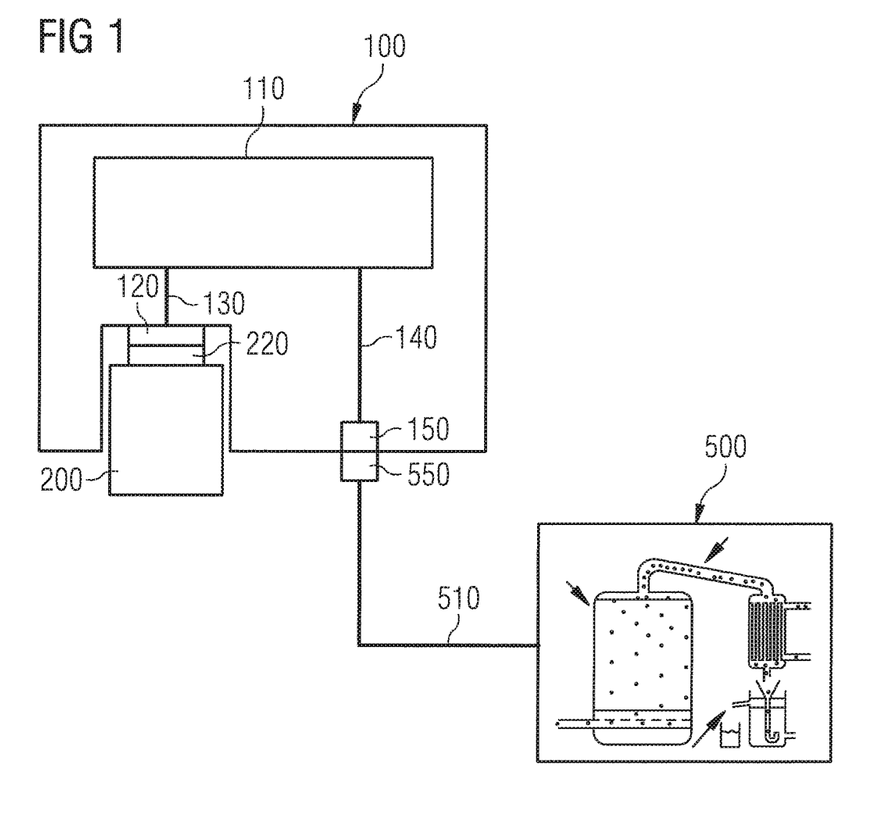
FIG. 1 shows an exemplary control system with a security module for controlling an installation in accordance with the invention.

FIG. 1 shows a control system 100 having an internal controller 110 for controlling an installation 500. Here, the control system 100 is an example of a basic control apparatus in accordance with the present invention. A control program executing in the controller 110 controls the installation 500 via an internal data bus 140 and an I/O interface 150, a field bus connection 550 and a field bus 510. The control system 100 also comprises a security data bus 130 that is used to connect a security module 200 in accordance with the present invention to the controller 110. The connection is effected via a plug element 120 of the control system 100 and a corresponding mating plug element 220 of the security module 200.

The security module 200 comprises, for example, a key for encrypting data that are transmitted from the controller 110 to the installation 500.

In this case, the security module 200 may contain, for example, keys that are transmitted, via the security data bus 130, to the controller 110 in order to be used there to encrypt the data transmitted to the installation 500. Alternatively, the security module 200 may also comprise the keys and the entire encryption logic, with the result that data to be transmitted from the controller 110 to the installation 500, for example, are first transmitted, via the security bus 130, to the security module, are encrypted there, and the encrypted data are transmitted back, via the security data bus 130, to the controller 110 and are transmitted from there to the installation 500.

Figure 2:
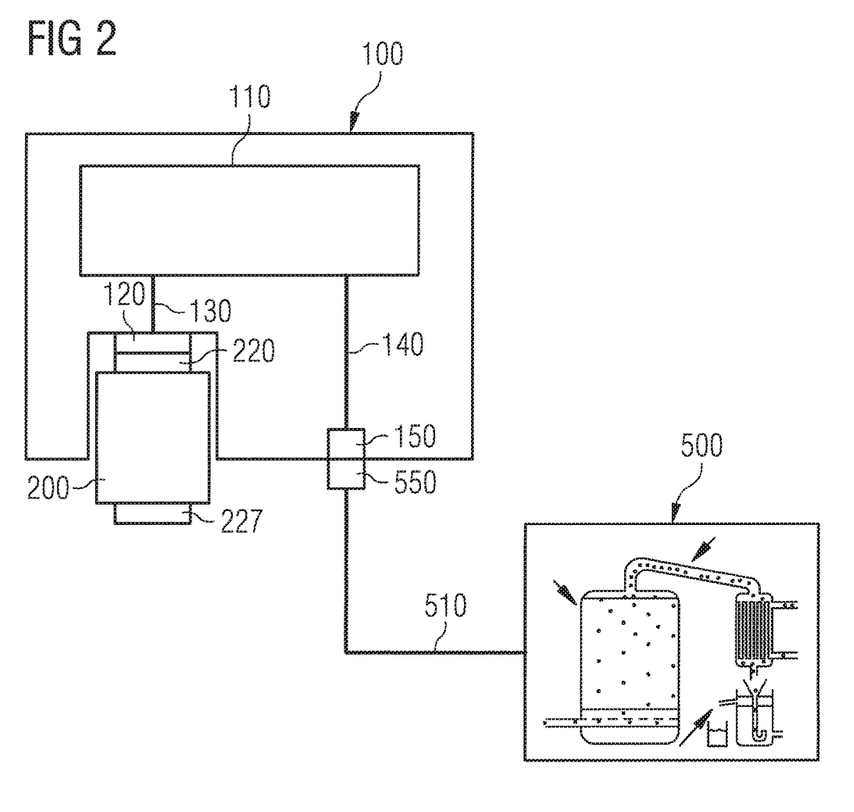
FIG. 2 shows a control device of FIG. 1 with an external module interface of the security module in accordance with the invention.

FIG. 2 shows the control system illustrated in FIG. 1, where the security module 200 in the configuration illustrated in FIG. 1 has an additional external communication interface including an external connection element 227 that enables direct communication with an external data processing device. The external communication interface of the security module 200 may be, for example, in the form of an Ethernet or Internet interface or in the form of a field bus interface having an external connection element 227 accordingly adapted to the interface type. With this external communication interface of the security module 200, the security module, for example, can communicate directly, or the controller 110 can also alternatively communicate via the security module 200, with a further control system, a computer, the installation 500 or else a further security module in accordance with the present invention (for example, inside a further security control device in accordance with the present invention).

Figure 3:
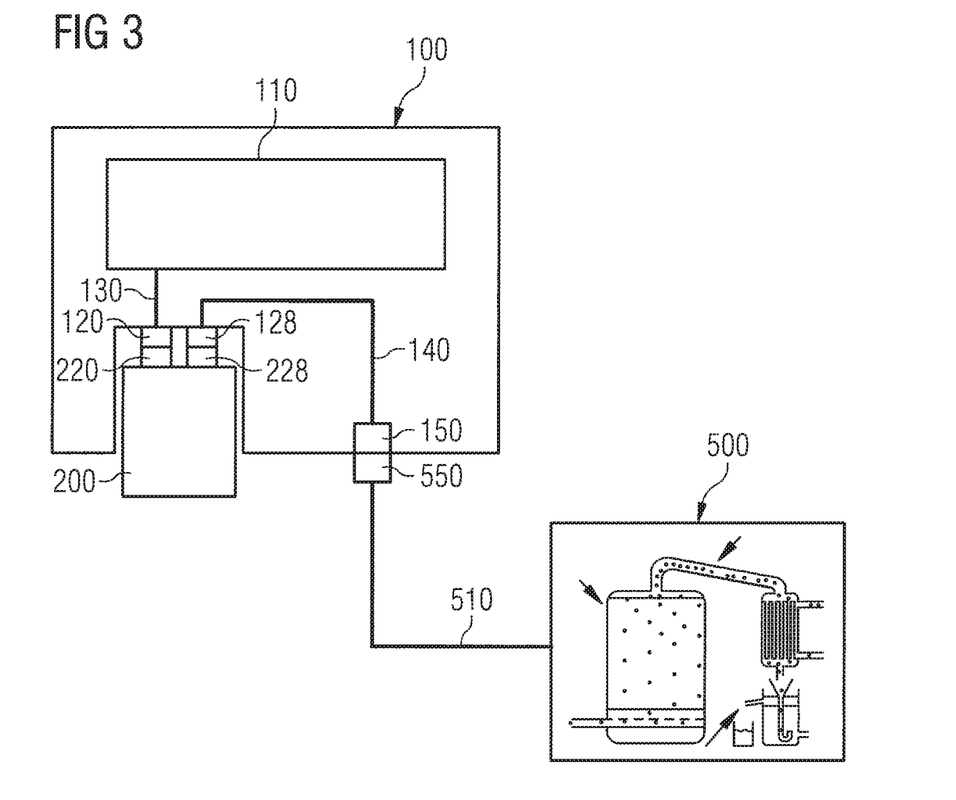
FIG. 3 shows a control device of FIG. 1 with modified internal communication.

FIG. 3 shows an alternative configuration of the control system 100, where the control system 100 comprises an additional plug connector 128 for making contact with an additional mating plug connector 228 of the security module 200, and the data connection 140 to the I/O interface 150 of the control system 100 is now effected directly from the additional plug connector 128 of the control system 100. This configuration makes it possible, for example, to more easily encrypt data transmitted to the installation 500 by virtue of the controller 110 transmitting the data to be transmitted to the security module 200 via the security data bus 130, by virtue of the data being encrypted there and then being directly transmitted, in encrypted form, from the security module to the installation 500 via the I/O data bus 140 and the field bus 510.

Figure 4:
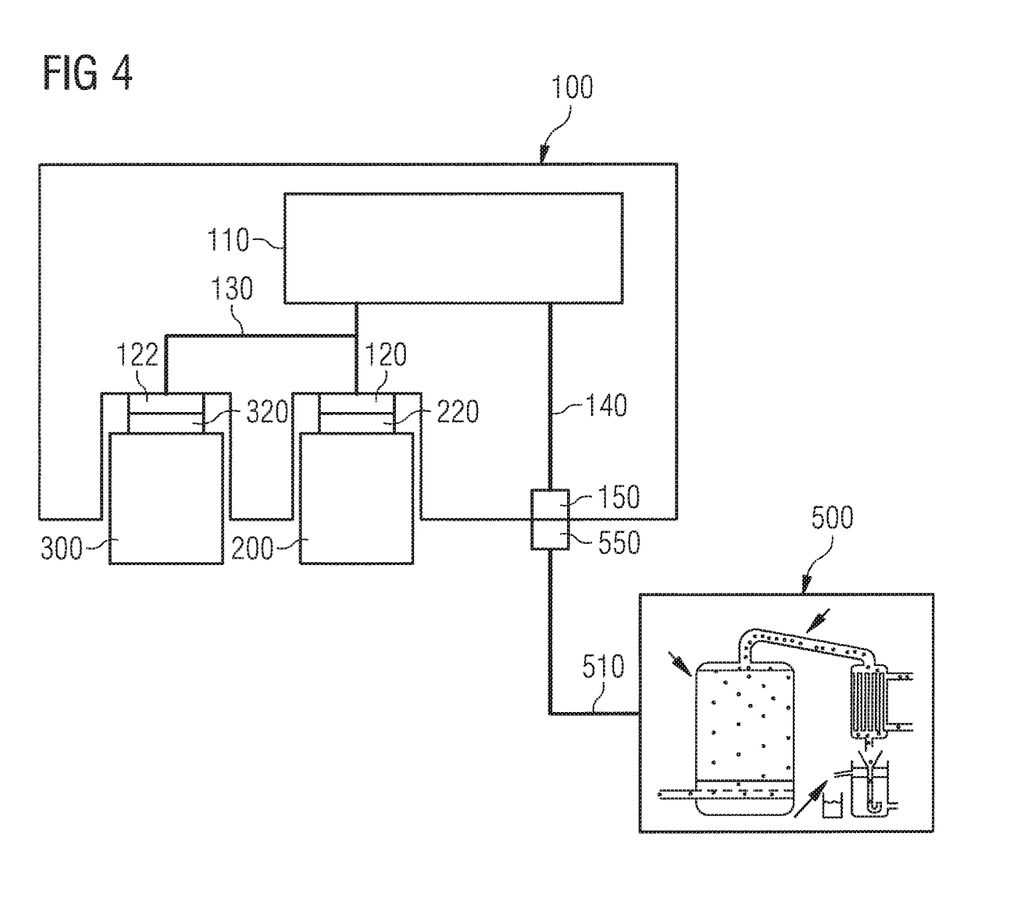
FIG. 4 shows a control device of FIG. 1 with a second security module.

FIG. 4 shows a further possible configuration of the control system 100 in which, in addition to the security module, a further security module 300 is connected to the controller 110 via the security data bus 130. The further security module 300 comprises a further mating plug element 320, via which the further security module 300 can communicate using a further plug element 122 of the control system 100 via the security data bus 130.

In this case, the control system 100, the security module 200 and the further security module 300 can be configured such that the controller 110 respectively communicates separately with each of the security modules 200, 300 and respectively retrieves supplementary information from the security modules 200, 300 or transmits that information to the security modules 200, 300. Alternatively, the security modules 200, 300 may also be configured such that they are able to communicate with one another via the security data bus 130.

In this manner, the security modules 200, 300 can also directly interact. The system illustrated in FIG. 4 can be configured, for example, such that the first security module 200 comprises a key management system, whereas the second security module 300 comprises an encryption mechanism itself. In such a system, the key management can be implemented, for example, between the controller 110 and the first security module 200 and the subsequent encryption can be subsequently performed in the second security module 300. Alternatively, the second security module 300 can be provided with a corresponding key by the first security module and the key management implemented there via the security data bus 130 and data present in the second security module and data transmitted from the controller 110 to the second security module 300 can be encrypted. These data can then be subsequently transmitted to the installation 500, for example, via the controller 110 and the field bus 510.

In an embodiments of the configuration illustrated in FIG. 4, a further security data bus (not illustrated in FIG. 4) may be alternatively provided and exclusively connects the two security modules 200, 300. This security data bus may either be present as part of the control system 100 or may directly connect the two modules, such as outside the basic apparatus, via a separate component (for example a cable).

Figure 5:
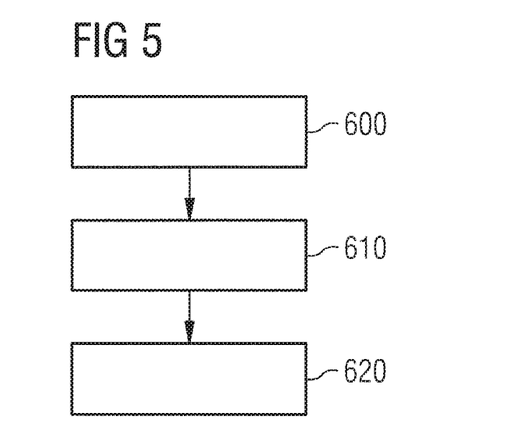
FIG. 5 shows an exemplary method sequence during the cryptographic processing of data in accordance with the invention.

FIG. 5 shows an exemplary encryption sequence using the control system 100 illustrated in FIG. 1, where the controller 110 includes a separate internal crypto functionality according to the present description. In FIG. 5, data are input in a first method step 600, these data are processed in a second method step 610 using the internal crypto functionality of the controller 110 and the crypto functionality of the security module 200. In a third method step 620, these processed data are then output.

Figure 6:
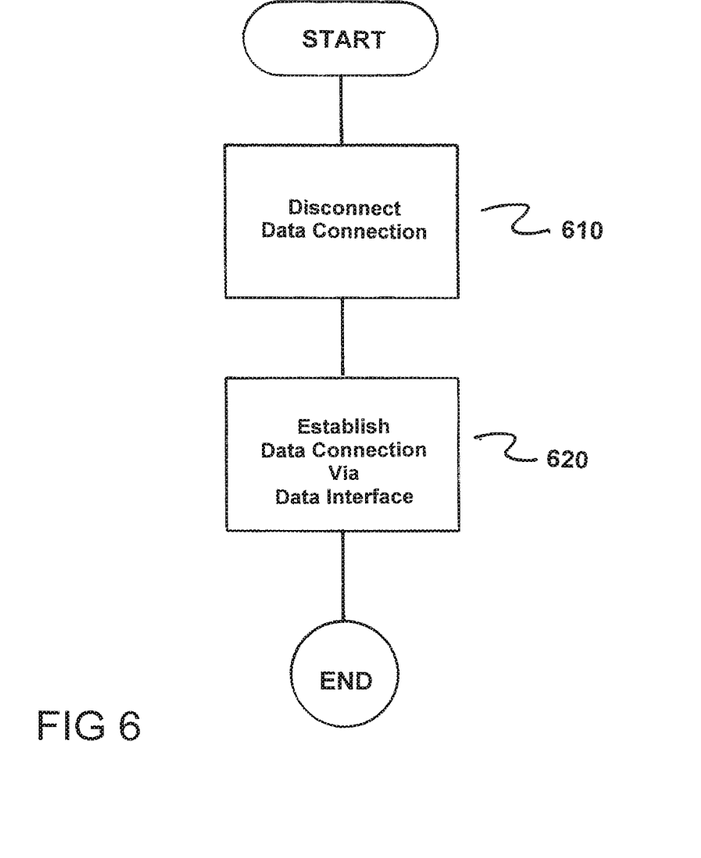
FIG. 6 is a flowchart of the method in accordance with the invention.

FIG. 6 is a flowchart of the method for operating a modular security control device, where the basic control apparatus 100 and the security module 200, 300 each include an interface connection element 120, 122, 128, 220, 320, 228 that is utilized to establish a data connection between the basic control apparatus 100 and the security module 200, 300. The method comprises disconnecting the data connection between the basic control apparatus 100 and the security module 200, 300, as indicated in step 610.

Next, a data connection is established via the data interface between the basic control apparatus 100 and a second security module 200, 300 having a second cryptographic functionality, as indicated in step 620.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A modular security control device for controlling an apparatus or an installation of an industrial manufacturing system, comprising:
   a basic control apparatus configured such that the apparatus or the installation of the industrial manufacturing system which is connected or is connectable to the basic control apparatus is controlled or controllable via a sequence of a control program in the basic control apparatus;
   a security module configured to provide or perform a cryptographic functionality for the basic control apparatus, the security module being connected to the basic control apparatus over a data connection by a data interface, the basic control apparatus being configured to interact with the security module to achieve a security function of the security control device, and the basic control apparatus being further configured to query at least one of an identity and authenticity of the security module; and
   a protector configured such that, in a protected state of the security control device, at least one of separation and wiretapping of the data connection between the basic control apparatus and the security module is prevented or impeded.

2. The modular security control device as claimed in claim 1, wherein the security module is releasably connected to the basic control apparatus.

3. The modular security control device as claimed in claim 2, wherein the basic control apparatus is operated or operable with a basic apparatus functionality when the security module is released.

4. The modular security control device as claimed in claim 2, wherein the basic control apparatus s further configured to interact with a second security module which is exchanged for the security module and includes a second cryptographic functionality to achieve at least one of the security function and a further security function of the security control device.

5. The modular security control device as claimed in claim 3, wherein the basic control apparatus is further configured to interact with a second security module which is exchangeable for the security module and includes a second cryptographic functionality to achieve at least one of the security function and a further security function of the security control device.

6. The modular security control device as claimed in claim 1, wherein the basic control apparatus comprises a housing, a recess in the housing being configured to at least partially accommodate the security module, an interface connection element for the data interface also being arranged in the basic control apparatus such that, when the security module is accommodated in the recess, data are interchanged or interchangeable between the basic control apparatus and the security module.

7. The modular security control device as claimed in claim 1,
   wherein the security module is also fixed with respect to the basic control apparatus in the secured state.

8. The modular security control device as claimed in claim 1, wherein at least one of (i) identification information relating to the security module is transmitted to the basic control apparatus via the data interface and is stored in the basic control apparatus and (ii) identification information relating to the basic control apparatus is transmitted to the security module via the data interface and is stored in the security module.

9. The modular security control device as claimed in claim 1, wherein at least one of the basic control apparatus and the security module is configured such that at least one of separation and wiretapping of the data connection between the basic control apparatus and the security module is at least one of (i) detected or detectable, (ii) recorded and (iii) logged.

10. The modular security control device as claimed in claim 9, wherein a security-relevant action is initiated after at least one of separation and wiretapping of the data connection between the basic control apparatus and the security module has been at least one of (i) detected, (ii) recorded and (iii) logged.

11. The modular security control device as claimed in claim 1, wherein the security module is configured to check at least one of (i) an identity and (ii) authenticity of the basic control apparatus which is connected by the data interface.

12. The modular security control device as claimed in claim 1, wherein the basic control apparatus comprises a data bus for interchanging data with an external device; and wherein the data interface to the security module inside the basic control apparatus is configured and arranged such that data interchanged between the basic control apparatus and the external device via the data bus are passed through the security module.

13. The modular security control device as claimed in claim 1, wherein the basic control apparatus comprises a data bus for interchanging data with an external device; and wherein the data interface to the security module within the basic control apparatus is configured and arranged such that data interchanged between the basic control apparatus and the external device via the data bus are not passed through the security module.

14. The modular security control device as claimed in claim 1, wherein the security module further comprises an external module interface for communicating with at least one external device.

15. The modular security control device as claimed in claim 1, wherein the basic control apparatus comprises a detection device which is configured such that the detection device is utilized to determine whether a security module is connected to the basic control apparatus via the data interface.

16. The modular security control device as claimed in claim 15, wherein the basic control apparatus is further configured such that at least one functionality of the basic control apparatus is prevented if the detection device does not detect a security module connected via the data interface.

17. The modular security control device as claimed in claim 15, wherein the basic control apparatus is further configured such that a separate basic apparatus crypto functionality provided in the basic control apparatus is utilized instead of the cryptographic functionality of the security module when the detection device fails to detect the security module connected by the data interface.

18. The modular security control device as claimed in claim 16, wherein the basic control apparatus is further configured such that a separate basic apparatus crypto functionality provided in the basic control apparatus is utilized instead of the cryptographic functionality of the security module when the detection device fails to detect the security module connected by the data interface.

19. The modular security control device as claimed in claim 17, wherein the basic control apparatus is further configured to utilize a cryptographic functionality of a connected security module instead of the separate basic apparatus crypto functionality or in combination with the separate basic apparatus crypto functionality if the detection device detects a security module connected via the data interface.

20. The modular security control device as claimed in claim 1, wherein the modular security control device comprises a further security module which is configured to provide or perform a further cryptographic functionality for the basic control apparatus, the further security module being connected to the basic control apparatus via a further data connection via a further data interface.

21. The modular security control device as claimed in claim 1, wherein at least one of (i) the basic control apparatus is configured to interact with the further security module to achieve a further security function of the security control device and (ii) the further security module is configured to directly interact with the security module.

22. The modular security control device as claimed in claim 1, wherein the security module is configured as an electronic module which is programmable or configurable by a user.

23. The modular security control device as claimed in claim 22, wherein at least one of (i) the security module is fixed with respect to the basic control apparatus in the secured state and (ii) the modular security control device is configured such that, in a protected state of the modular security control device, at least one of separation and wiretapping of the data connection between the basic control apparatus and the security module is prevented or impeded.

24. The modular security control device as claimed in claim 22, wherein the electronic module is permanently programmable or configurable by the user.

25. A method for operating a modular security control device in which a basic control apparatus and a security module each include an interface connection element, the method comprising:

establishing a data connection between the basic control apparatus and the security module, the modular security control device controlling an apparatus or an installation of an industrial manufacturing system;

disconnecting the data connection between the basic control apparatus and the security module;

establishing a data connection via the data interface between the basic control apparatus and a second security module having a second cryptographic functionality during control of the apparatus or the installation of the industrial manufacturing system;

transmitting identification information relating to the second security module to the basic control apparatus via the data interface, after establishing the data connection between the basic control apparatus and the second security module; and storing the identification information in the basic control apparatus.

26. The method for operating a modular security control device as claimed in claim 25, further comprising:

at least one of (i) checking at least one of an identity and authenticity of the second security module by the basic control apparatus and (ii) checking at least one of an identity and authenticity of the basic control apparatus by the second security module after establishing the data connection between the basic control apparatus and the second security module.

27. The method for operating a modular security control device as claimed in claim 26, further comprising:
   initiating a security error measure after an unsuccessful or erroneous check of at least one of (i) the identity and (ii) authenticity of at least one of the second security module and the basic control apparatus.

* * * * *